US 9,197,551 B2

(12) United States Patent
DeCusatis et al.

(10) Patent No.: US 9,197,551 B2
(45) Date of Patent: Nov. 24, 2015

(54) HETEROGENEOUS OVERLAY NETWORK TRANSLATION FOR DOMAIN UNIFICATION

(71) Applicant: International Business Machines Corporation, Armonk, NY (US)

(72) Inventors: Casimer M. DeCusatis, Poughkeepsie, NY (US); Mircea Gusat, Langnau (CH); Keshav G. Kamble, Fremont, CA (US); Cyriel J. Minkenberg, Gutenswil (CH); Vijoy A. Pandey, San Jose, CA (US); Renato J. Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 13/842,595

(22) Filed: Mar. 15, 2013

(65) Prior Publication Data

US 2014/0269705 A1    Sep. 18, 2014

(51) Int. Cl.
*H04L 12/28* (2006.01)
*G06F 15/16* (2006.01)
(Continued)

(52) U.S. Cl.
CPC ............... *H04L 45/52* (2013.01); *H04L 45/64* (2013.01)

(58) Field of Classification Search
CPC ......... H04L 12/56; H04L 12/28; H04L 45/52; G06F 15/16
USPC ......... 370/389, 390, 352, 400, 396, 392, 401, 370/409, 465–467, 419, 420; 709/203, 223, 709/224
See application file for complete search history.

(56) References Cited

U.S. PATENT DOCUMENTS

| 7,155,494 | B2 | 12/2006 | Czeiger et al. |
| 8,175,066 | B2 | 5/2012 | Park |
| 8,830,834 | B2 * | 9/2014 | Sharma et al. ................ 370/235 |

(Continued)

FOREIGN PATENT DOCUMENTS

| CN | 101188559 A | 5/2008 |
| CN | 101212454 A | 7/2008 |

(Continued)

OTHER PUBLICATIONS

International Search Report from PCT Application No. PCT/CN2014073010, dated May 29, 2014.
(Continued)

*Primary Examiner* — Hanh N Nguyen
(74) *Attorney, Agent, or Firm* — Zilka-Kotab, PC

(57) ABSTRACT

In one embodiment, a method for providing multi-protocol overlay handling includes receiving first traffic via an input overlay tunnel at a multi-protocol virtual tunnel end point (VTEP)-enabled device, the first traffic including a plurality of overlay-encapsulated packets which adhere to a first overlay network protocol, and wherein the input overlay tunnel adheres to the first overlay network protocol; routing the first traffic to a second overlay network tunnel which adheres to a second overlay network protocol when a destination of the first traffic is specified as the second overlay network tunnel, the second overlay network tunnel being terminated at the multi-protocol VTEP-enabled device; and bridging the first traffic to a destination overlay network tunnel terminated at the multi-protocol VTEP-enabled device when the destination of the first traffic is specified as the destination overlay network tunnel, the destination overlay network tunnel being terminated at the multi-protocol VTEP-enabled device.

19 Claims, 13 Drawing Sheets

(51) Int. Cl.
*H04L 12/781* (2013.01)
*H04L 12/715* (2013.01)

(56) References Cited

U.S. PATENT DOCUMENTS

| | | |
|---|---|---|
| 2011/0274108 A1 | 11/2011 | Fan |
| 2013/0163606 A1* | 6/2013 | Bagepalli et al. .............. 370/409 |
| 2013/0250951 A1* | 9/2013 | Koganti ........................ 370/390 |

FOREIGN PATENT DOCUMENTS

| | | |
|---|---|---|
| CN | 101917324 A | 12/2010 |
| WO | 2013007496 A1 | 1/2013 |

OTHER PUBLICATIONS

Written Opinion from PCT Application No. PCT/CN2014073010, dated May 28, 2014.

* cited by examiner

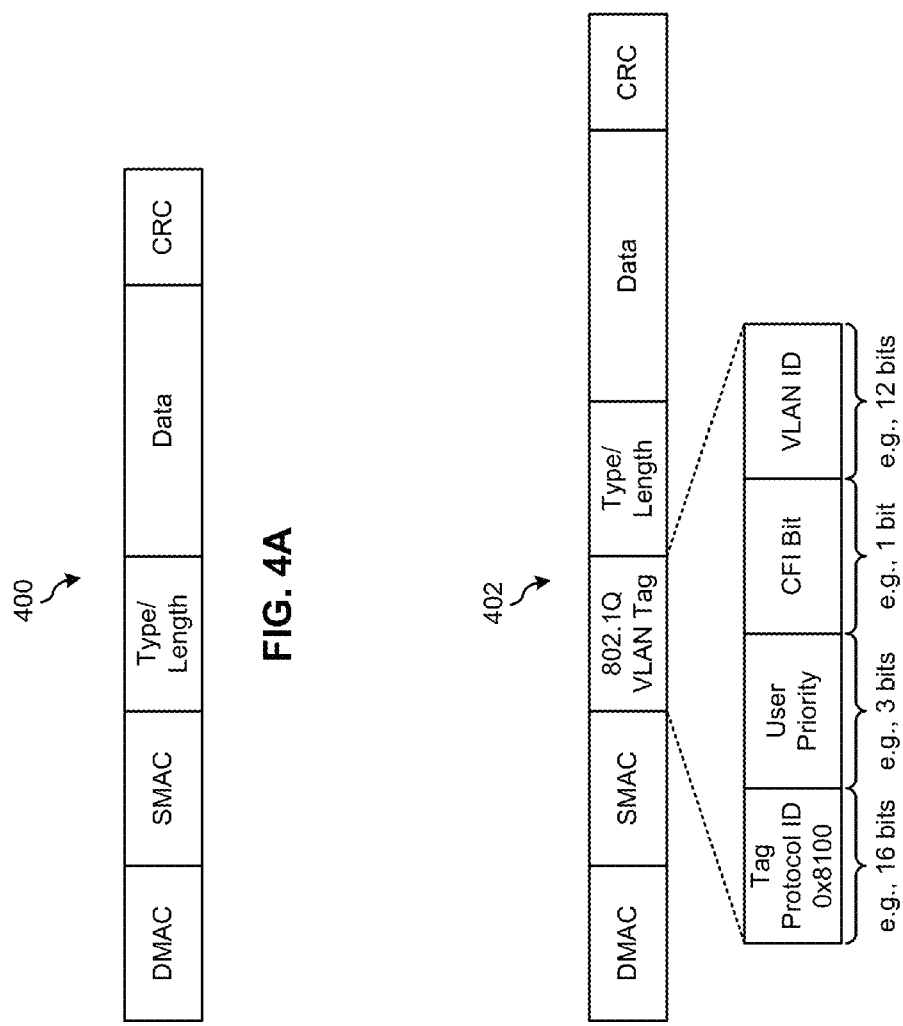

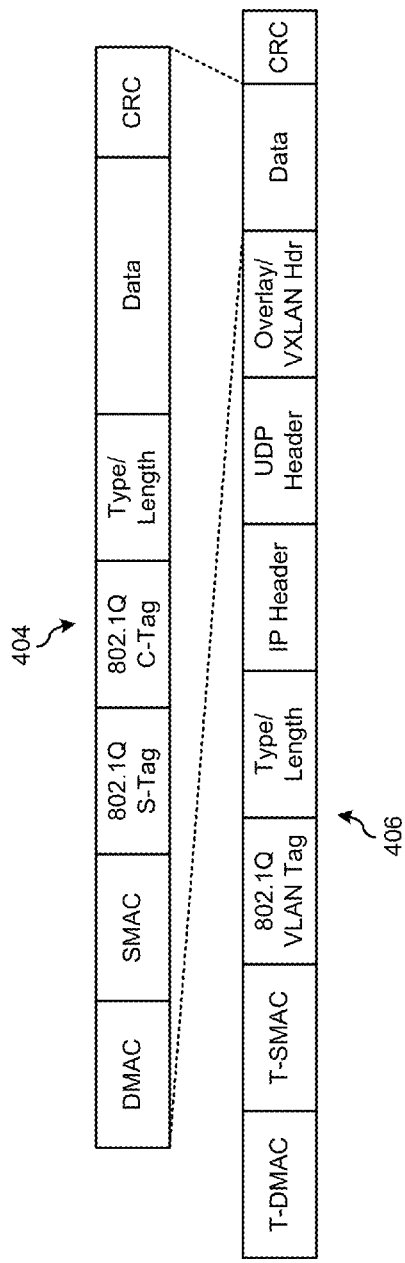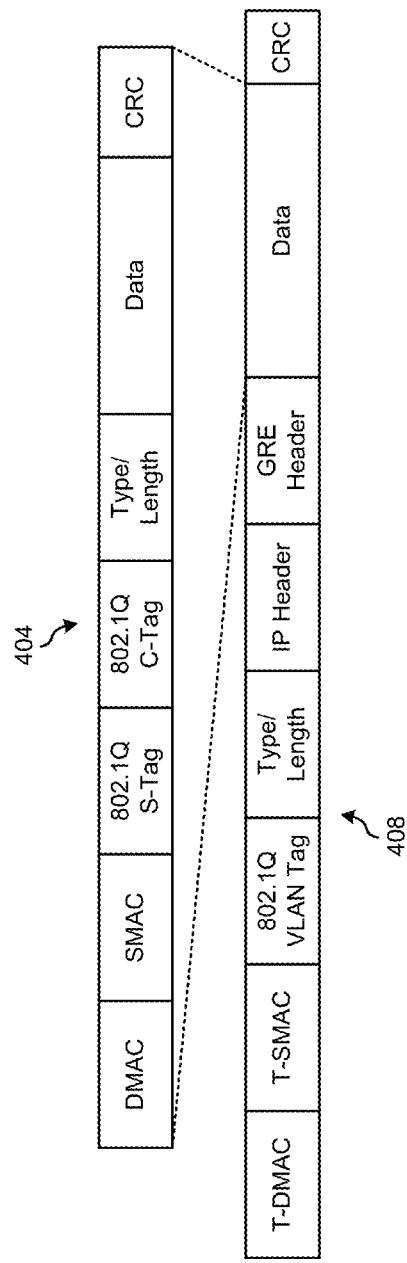
FIG. 4C
FIG. 4D

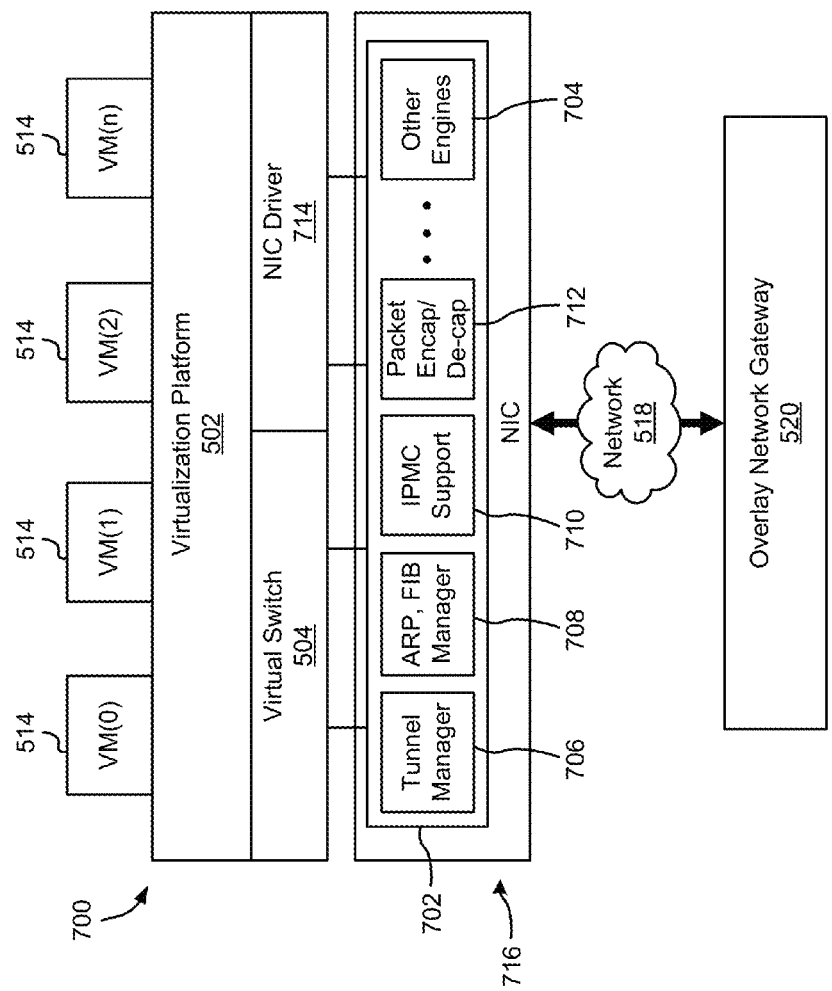

HETEROGENEOUS OVERLAY NETWORK TRANSLATION FOR DOMAIN UNIFICATION

BACKGROUND

The present invention relates to data center infrastructure, and more particularly, this invention relates to seamlessly communicating between divergent overlay network protocols to unify separate overlay domains.

Network virtualization is an emerging data center and cloud computing trend which aims to virtualize a network as seen by end stations in a way that greatly simplifies network provisioning in multi-tenant environments, as well as traditional environments. One of the more common techniques of achieving network virtualization is to use network overlays, where tunnels are established between servers, edge network switches, and gateways to which end stations connect. The tunnel is actually implemented by encapsulating packets transmitted by a source end station into an overlay header that transports the packet from the source switch to a target switch in user datagram protocol (UDP) transport via an internet protocol (IP)-based network. The overlay header includes an identifier (ID) that uniquely identifies the virtual network. The target switch (tunnel end point) strips off the overlay header encapsulation, UDP transport header, and IP header, and delivers the original packet to the destination end station via conventional network connections. In addition to this tunneling mechanism, the edge switches participate in an address discovery protocol, which may be learning/flooding based, or lookup-based.

An overlay network makes use of a particular overlay protocols, such as Virtual eXtensible Local Area Network (VXLAN), Locator/ID Separation Protocol (LISP), Network Virtualization using Generic Routing Encapsulation (NVGRE), Overlay Transport Virtualization (OTV), Virtual Private LAN Service (VPLS), etc., in order to connect geographically separated Layer-2 (L2) networks using tunnels. These are L2 over Layer-3 (L3) tunnels. L2 packets originated by a virtual machine (VM) in the overlay network and destined to another VM or group of VMs in the same overlay network in another physical location are carried over L3 tunnels.

However, the various divergent overlay protocols have different requirements for implementation, management, and use of the tunnels provided by the overlay protocols. Support must be provided for each overlay protocol's specific requirements, such as different virtualization platforms specific to each overlay protocol, packet-encapsulating protocols specific to each overlay protocol, etc. In addition, each virtualization platform, e.g., VMware's Hypervisor, Microsoft's Hyper-V, KVM, etc., requires separate implementation for each type of overlay network.

There simply is no standard for server virtualization for interoperability across different types of overlay protocols. There are multiple network virtualization mechanisms and they do not comply with each other. Each overlay protocol has a different frame format, different tenant identifier concepts and frame size for storage of the tenant identifier, and VMs across different overlay protocols are not capable of communicating with one another.

SUMMARY

In one embodiment, a network system includes multi-protocol virtual tunnel end point (VTEP) logic implemented in and/or integrated with a network device, the logic being adapted for terminating one or more first overlay network tunnels which adhere to a first overlay network protocol, terminating one or more second overlay network tunnels which adhere to a second overlay network protocol, and providing multi-protocol overlay functionality to packets received by the network device.

In another embodiment, a method for providing multi-protocol overlay handling includes receiving first overlay network traffic via an input overlay tunnel at a multi-protocol VTEP-enabled device, wherein the first overlay network traffic includes a plurality of overlay-encapsulated packets which adhere to a first overlay network protocol, and wherein the input overlay tunnel adheres to the first overlay network protocol; routing the first overlay network traffic to a second overlay network tunnel which adheres to a second overlay network protocol when a destination of the first overlay network traffic is specified as the second overlay network tunnel, the second overlay network tunnel being terminated at the multi-protocol VTEP-enabled device; and bridging the first overlay network traffic to a destination overlay network tunnel terminated at the multi-protocol VTEP-enabled device when the destination of the first overlay network traffic is specified as the destination overlay network tunnel, the destination overlay network tunnel being terminated at the multi-protocol VTEP-enabled device.

In yet another embodiment, a method for providing multi-protocol overlay handling includes receiving first overlay network traffic via an input overlay tunnel at a multi-protocol VTEP-enabled device, wherein the first overlay network traffic includes a plurality of overlay-encapsulated packets which adhere to a first overlay network protocol, and wherein the input overlay tunnel adheres to the first overlay network protocol; routing the first overlay network traffic to a second overlay network tunnel which adheres to a second overlay network protocol when a destination of the first overlay network traffic is specified as the second overlay network tunnel, the second overlay network tunnel being terminated at the multi-protocol VTEP-enabled device; bridging the first overlay network traffic to a destination overlay network tunnel terminated at the multi-protocol VTEP-enabled device when the destination of the first overlay network traffic is specified as the destination overlay network tunnel, the destination overlay network tunnel being terminated at the multi-protocol VTEP-enabled device; receiving second overlay network traffic via a second input overlay tunnel at the multi-protocol VTEP-enabled device, wherein the second overlay network traffic includes a plurality of overlay-encapsulated packets which adhere to the second overlay network protocol, and wherein the second input overlay tunnel adheres to the second overlay network protocol; routing the second overlay network traffic to a first overlay network tunnel which adheres to the first overlay network protocol when a destination of the second overlay network traffic is specified as the first overlay network tunnel, the first overlay network tunnel being terminated at the multi-protocol VTEP-enabled device; and bridging the second overlay network traffic to a second destination overlay network tunnel terminated at the multi-protocol VTEP-enabled device when the destination of the second overlay network traffic is specified as the second destination overlay network tunnel, the second destination overlay network tunnel being terminated at the multi-protocol VTEP-enabled device.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 4A-4D show examples of Ethernet frames according to various embodiments.

FIG. 7A shows a server using a network interface card (NIC) having overlay network gateway functionality according to one approach.

DETAILED DESCRIPTION

Figure 1:
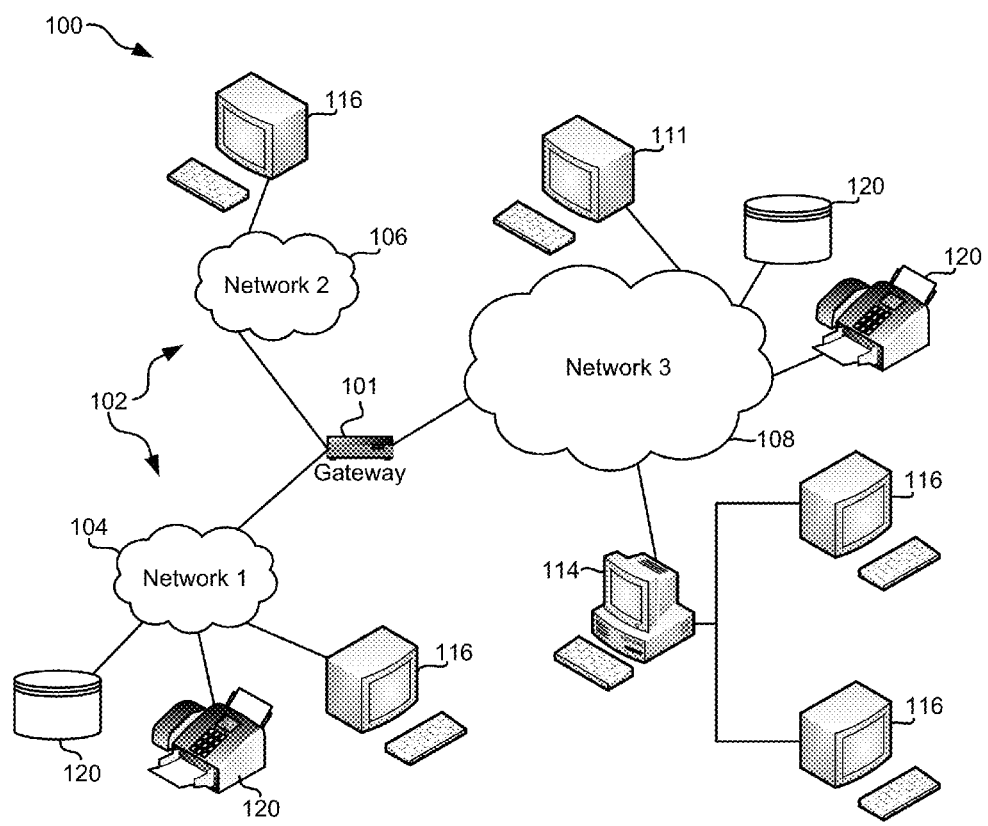
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one general embodiment, a network system includes multi-protocol virtual tunnel end point (VTEP) logic implemented in and/or integrated with a network device, the logic being adapted for terminating one or more first overlay network tunnels which adhere to a first overlay network protocol, terminating one or more second overlay network tunnels which adhere to a second overlay network protocol, and providing multi-protocol overlay functionality to packets received by the network device.

In another general embodiment, a method for providing multi-protocol overlay handling includes receiving first overlay network traffic via an input overlay tunnel at a multi-protocol VTEP-enabled device, wherein the first overlay network traffic includes a plurality of overlay-encapsulated packets which adhere to a first overlay network protocol, and wherein the input overlay tunnel adheres to the first overlay network protocol; routing the first overlay network traffic to a second overlay network tunnel which adheres to a second overlay network protocol when a destination of the first overlay network traffic is specified as the second overlay network tunnel, the second overlay network tunnel being terminated at the multi-protocol VTEP-enabled device; and bridging the first overlay network traffic to a destination overlay network tunnel terminated at the multi-protocol VTEP-enabled device when the destination of the first overlay network traffic is specified as the destination overlay network tunnel, the destination overlay network tunnel being terminated at the multi-protocol VTEP-enabled device.

In yet another general embodiment, a method for providing multi-protocol overlay handling includes receiving first overlay network traffic via an input overlay tunnel at a multi-protocol VTEP-enabled device, wherein the first overlay network traffic includes a plurality of overlay-encapsulated packets which adhere to a first overlay network protocol, and wherein the input overlay tunnel adheres to the first overlay network protocol; routing the first overlay network traffic to a second overlay network tunnel which adheres to a second overlay network protocol when a destination of the first overlay network traffic is specified as the second overlay network tunnel, the second overlay network tunnel being terminated at the multi-protocol VTEP-enabled device; bridging the first overlay network traffic to a destination overlay network tunnel terminated at the multi-protocol VTEP-enabled device when the destination of the first overlay network traffic is specified as the destination overlay network tunnel, the destination overlay network tunnel being terminated at the multi-protocol VTEP-enabled device; receiving second overlay network traffic via a second input overlay tunnel at the multi-protocol VTEP-enabled device, wherein the second overlay network traffic includes a plurality of overlay-encapsulated packets which adhere to the second overlay network protocol, and wherein the second input overlay tunnel adheres to the second overlay network protocol; routing the second overlay network traffic to a first overlay network tunnel which adheres to the first overlay network protocol when a destination of the second overlay network traffic is specified as the first overlay network tunnel, the first overlay network tunnel being terminated at the multi-protocol VTEP-enabled device; and bridging the second overlay network traffic to a second destination overlay network tunnel terminated at the multi-protocol VTEP-enabled device when the destination of the second overlay network traffic is specified as the second destination overlay network tunnel, the second destination overlay network tunnel being terminated at the multi-protocol VTEP-enabled device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a virtual LAN (VLAN), a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
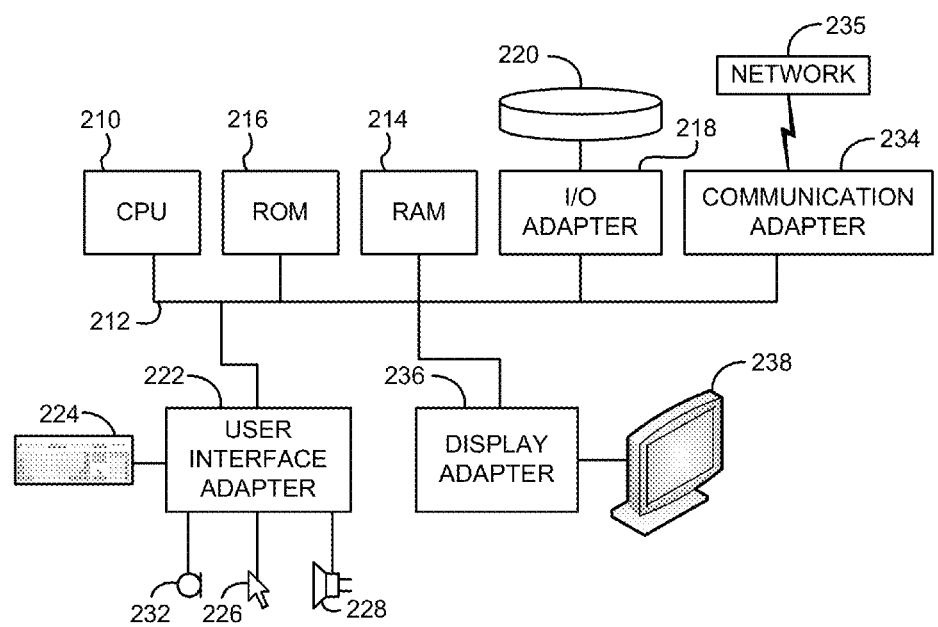
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
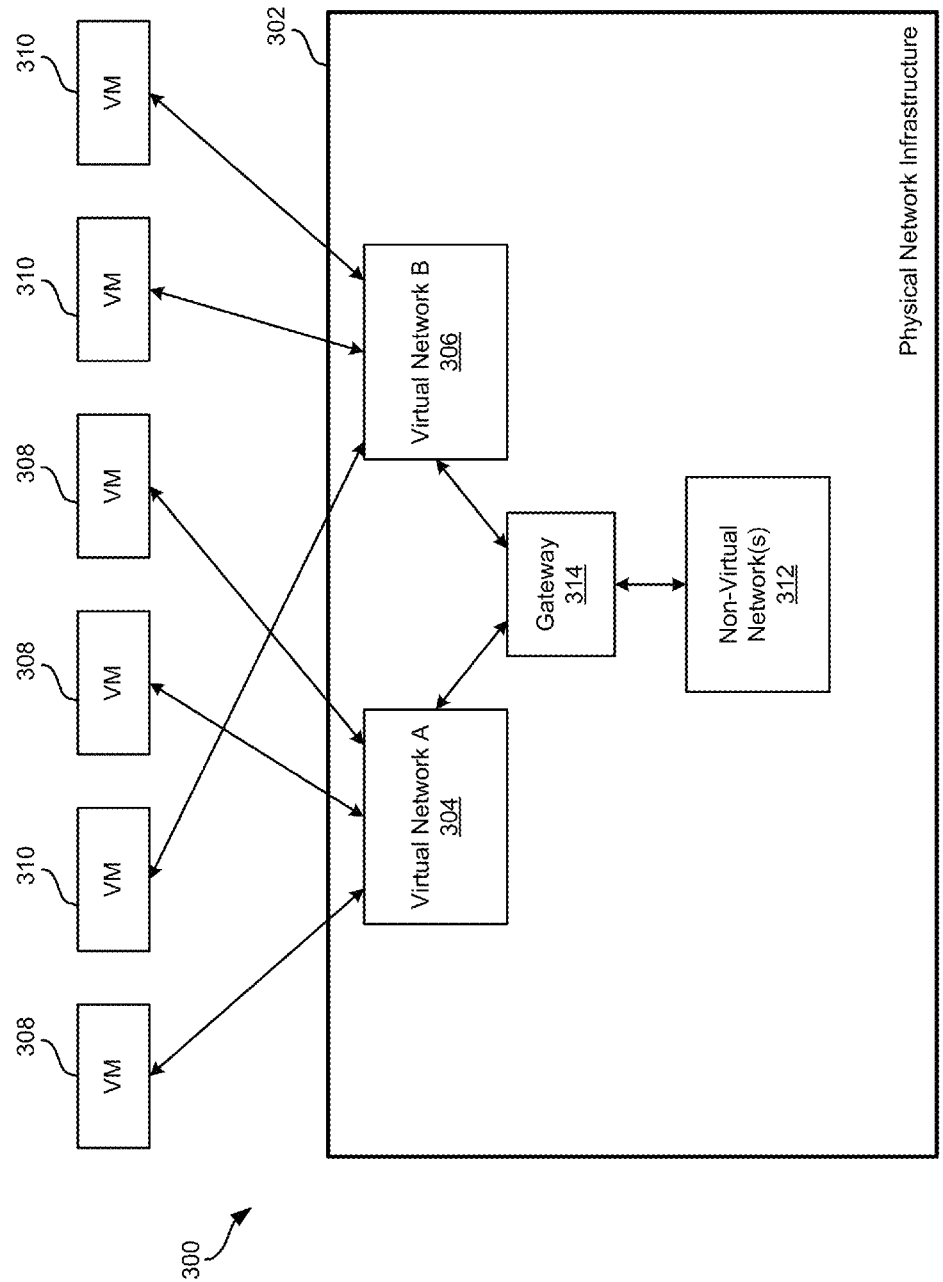
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered to the traffic flow and/or to one or more packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may utilize, support, and/or serve any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

Components of an overlay network 300 typically identify where to route packets based on a virtual network identifier, referred to as a VNI or VNID. This is typically a 24-bit code or number, which excludes 0x0 and 0xFFFFFF. The overlay network 300 has the capability of tunneling Layer-2 (L2) packets over the Layer-3 (L3) network by encapsulating the L2 packets into an overlay header. This may be performed using Virtual eXtensible Local Area Network (VXLAN) or some other overlay capable protocol, such as Locator/ID Separation Protocol (LISP), Virtual Private LAN Service (VPLS), Overlay Transport Virtualization (OTV), Network Virtualization using Generic Routing Encapsulation (NVGRE), etc.

The packet may also be encapsulated in a user datagram protocol (UDP) and internet protocol (IP) UDP/IP header. The overlay network 300 may include one or more point-to-point tunnels, and/or point-to-multipoint tunnels. In addition, any of these tunnels may be created, removed, altered and modified based on any number of factors, such as new devices being added to the overlay network 300, removal of devices from the overlay network 300, startup of any end devices, i.e., devices managing tunnel end points, such as virtual overlay network gateways, Hypervisors, switches capable of overlay functionality, etc.

In order for a device to manage a tunnel, there needs to be a mapping between an original packet's source address, destination address, and a tunnel identifier. In this way, a physical server is capable of forwarding the encapsulated original packet to the proper destination device.

In order to increase performance of a virtual networking server using a hypervisor, network traffic processing may be accelerated by utilizing an Overlay Network Offload System (ONOS) within the NIC of the server. In some embodiments, a system may include a NIC with an ONOS, which may be similar to or different from a server, as traditionally known. Specifically, the ONOS may be adapted for managing virtual tunnel end points (VTEPs), address resolution protocol (ARP) cache handling, ARP learning, packet encapsulation and de-capsulation for each overlay network, etc. Furthermore, any overlay traffic may be processed exclusively via the ONOS, possibly using separate modules and/or processors, and the processed traffic may be delivered to the hypervisor for final delivery to the appropriate VM(s) or the traffic may be sent down to the network for delivery to a destination VTEP.

Although overlay networks are very useful in providing a fabric path (connectivity) between devices, along with other beneficial aspects of overlay networks discussed herein, there currently is no way to manage different overlay protocols within the same domain. Referring now to FIGS. 4A-4B, some exemplary Ethernet frame formats are shown according to various embodiments.

FIG. 4A shows a simple Ethernet frame 400 without any priority information included. This Ethernet frame 400 includes a destination media access control (DMAC) address which indicates a destination to forward the packet on to, a source MAC (SMAC) address which indicates a source device or originator for the packet, and a type/length field into which a type-length-value (TLV) may be placed to indicate the type, length, and miscellaneous information about the packet. The Ethernet frame 400 also includes a data field for placing data, and a cyclic redundancy check (CRC) field for detecting errors.

FIG. 4B shows a single VLAN tagged Ethernet frame 402 according to one embodiment. In a first step when preparing a packet to be sent out, priority bits may be set in an IEEE 802.1Q tag, which results in the single VLAN tagged Ethernet frame 402. As this Ethernet frame 402 shows, the 802.1Q VLAN tag includes some specific priority information, including a tag protocol ID 0x8100 (which may be any length, e.g., 16 bits in length according to IEEE 802.1Q), a user priority field (which may be any length, e.g., 3 bits in length according to IEEE 802.1Q), a canonical format identifier (CFI) bit (any length, e.g., 1 bit in length according to IEEE 802.1Q), and a VLAN ID (which may be any length, e.g., 12 bits in length according to IEEE 802.1Q), according to one embodiment. The IEEE 802.1Q networking standard provides additional information about what each field may be used for and field lengths, and what information may be stored in each field.

Referring again to FIGS. 4A-4B, according to VXLAN standards, in order to encapsulate an Ethernet frame for use in a VXLAN overlay network, a simple Ethernet frame 400 may be expanded to a single VLAN-tagged Ethernet frame 402, and then, as shown in FIG. 4C as Ethernet frame 404, both a service tag (S-tag) and a customer tag (C-tag) may be added. In addition, this Ethernet frame 404 may then be encapsulated into an overlay-capable tunnel frame 406 capable of being sent across a VXLAN overlay network. This overlay-capable tunnel frame 406 may include a tunnel DMAC (T-DMAC), a tunnel SMAC (T-SMAC), 802.1Q VLAN tag information that is inherited from the S-tag and C-tag information of the inner frame 404, an IP header, a UDP header, an Overlay/VXLAN header, data comprising the inner frame 404, and a CRC. If one of the simpler Ethernet frames 400, 402 described in FIGS. 4A-4B are included in the overlay-capable tunnel frame 406 shown in FIG. 4C, then some of the fields (such as the 802.1Q VLAN tag information, VLAN header, etc.) may be missing or have information omitted, without disrupting the ability to utilize the overlay-capable tunnel frame 406. In VXLAN, a virtual network identifier (VNID) is used to denote a domain for each separate virtual network in the VXLAN overlay network. For VXLAN, this VNID is set at 24 bits in length and is stored to the Overlay/VXLAN header.

Referring again to FIGS. 4A-4B, according to NVGRE standards, in order to encapsulate an Ethernet frame for use in a NVGRE overlay network, a simple Ethernet frame 400 may be expanded to a single VLAN-tagged Ethernet frame 402, and then, as shown in FIG. 4D as Ethernet frame 404, both a S-tag and a C-tag may be added. In addition, this Ethernet frame 404 may then be encapsulated into an overlay-capable tunnel frame 408 capable of being sent across a NVGRE overlay network. This overlay-capable tunnel frame 408 may include a T-DMAC, a T-SMAC, 802.1Q VLAN tag information that is inherited from the S-tag and C-tag information of the inner frame 404, an IP header, a GRE header, data comprising the inner frame 404, and a CRC. If one of the simpler Ethernet frames 400, 402 described in FIGS. 4A-4B are included in the overlay-capable tunnel frame 408 shown in FIG. 4D, then some of the fields (such as the 802.1Q VLAN tag information, VLAN header, etc.) may be missing or have information omitted, without disrupting the ability to utilize the overlay-capable tunnel frame 408. In NVGRE, a tenant identifier (ID) is used to denote domain for each separate tenant in the NVGRE overlay network. For NVGRE, this tenant ID is set at 24 bits and is stored to the GRE header.

Figure 5:
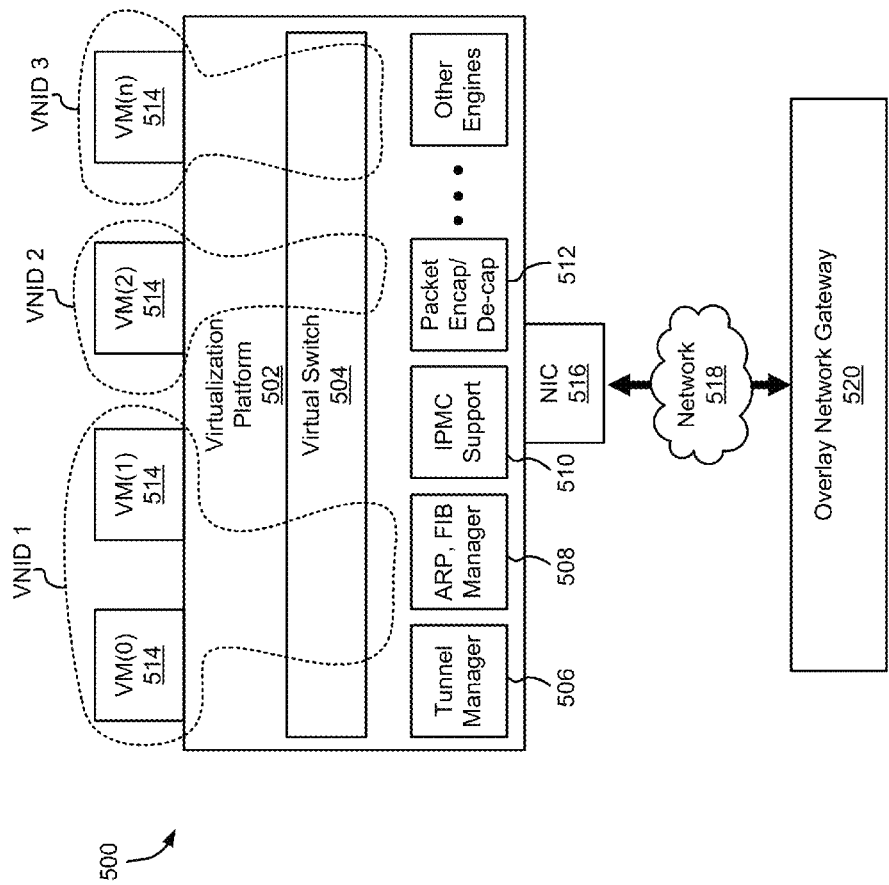
FIG. 5 shows a server connected to an underlay network, according to one approach.

With reference to FIG. 5, a server 500 is shown connected to an underlay network 518 (Layer-2 network) according to one embodiment. As shown, the server 500 includes a virtualization platform 502 which provides and manages a virtual switch 504. A virtualization platform 502 from any vendor and of any type may be used, such as VMware's Hypervisor, Microsoft's Hyper-V, KVM, etc.

To provide overlay functionality to the server 500, the virtualization platform 502 also interacts with a plurality of discrete software engines, such as a tunnel manager 506, an ARP and forwarding information base (FIB) manager 508, an engine for providing internet protocol multicast (IPMC) support 510, a packet encapsulation and de-capsulation (encap/de-cap) engine 512, and any other overlay-enhancing software engines as known in the art. The virtualization platform 502 also provides support for any number of VMs 514, shown in FIG. 5 as VM(0), VM(1), VM(2), ..., VM(n). The VMs 514 may be arranged in one or more virtual networks (each virtual network may have a different virtual network identifier (VNID), indicated as VNID 1, VNID 2, VNID 3, etc., in FIG. 5). The number and arrangement of the VMs 514 in the exemplary virtual networks is not meant to be limiting on what configurations are possible, as the Figures only show exemplary arrangements of VMs 514 and virtual networks.

In addition, the server 500 includes a physical NIC 516 which manages and provides for communications between the underlay network 518 and the server 500, in one approach. The NIC 516 includes one or more networking ports adapted for communicating with the underlay network 518 and the server 500. When a packet is encapsulated in an overlay header using the packet encap/de-cap engine 512, the NIC 516 simply passes the packet through to a destination specified in an outer header of the overlay-encapsulated packet.

According to one embodiment, in order to bridge between virtualized and non-virtualized networks, the packet may be delivered to an overlay network gateway 520, for further forwarding and/or routing outside of the virtual network in which the server 500 is located.

However, each type of virtualization platform is only capable of managing packets which have been formatted with a frame format consistent with the vendor's specified requirements. The two examples of frame formats provided in FIGS. 4C and 4D illustrate that although the frame formats may be very similar, the small changes are sufficient to cause one vendor's virtualization platform to fail to recognize a different vendor's frame formatted overlay packet.

Figure 6A:
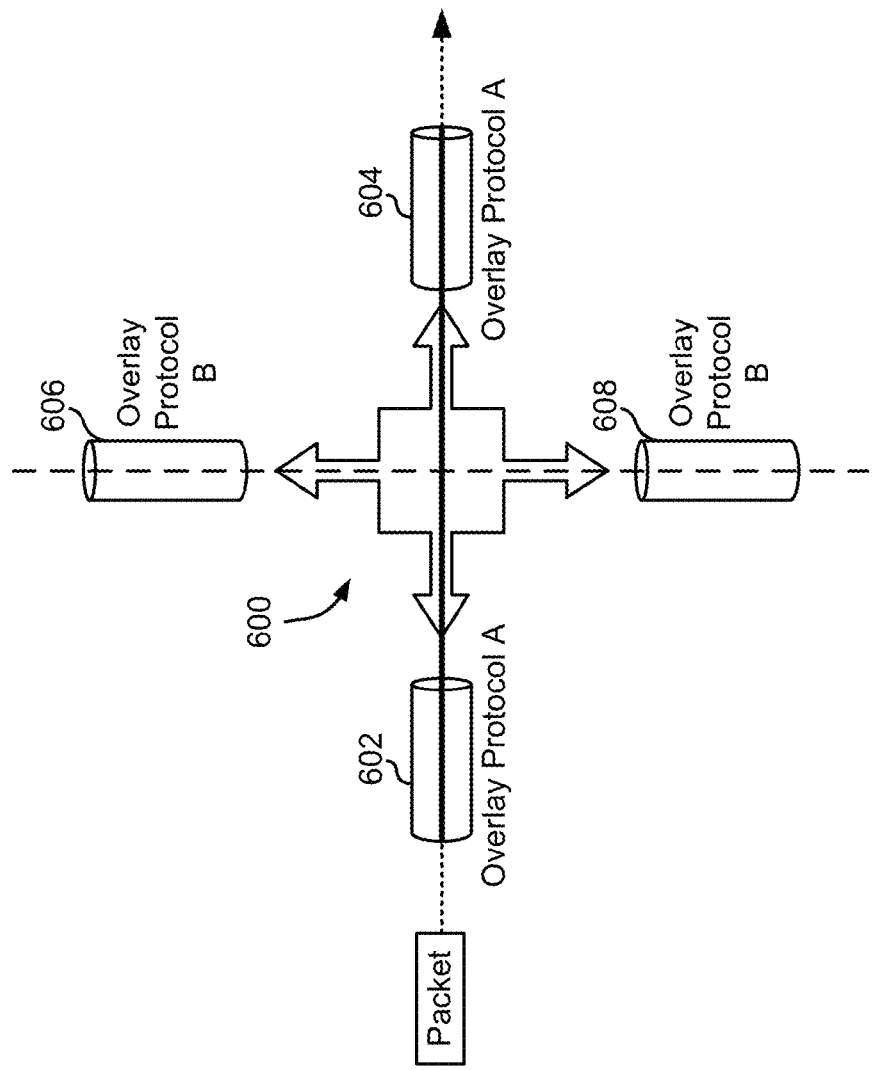
FIGS. 6A-6B show schematic diagrams of bridging and routing between overlay tunnels, respectively, according to various approaches.

With reference to FIG. 6A, bridging between homogeneous overlay tunnels is described, according to one embodiment. When two or more tunnels 602, 604 utilizing the same overlay protocol, such as NVGRE, VXLAN, VPLS, OTV, etc., terminate on an IP interface 600 on which other heterogeneous overlay tunnels 606, 608 also terminate, a method of bridging between the homogeneous tunnels 602 and 604 or 606 and 608, and their associated overlay protocols, needs to be provided in order to seamlessly utilize each of the overlay tunnels that have a virtual tunnel end point (VTEP) that is the IP interface 600.

In FIG. 6A, for simplicity, two tunnels 602, 604 of one overlay protocol A are shown terminating at the same IP interface 600 as two tunnels 606, 608 of another overlay protocol B, but any number of tunnels and overlay protocols may be terminated at the IP interface 600 according to processing capacity, among other factors. Protocol A's tunnels 602, 604 may have their own overlay domain, while overlay protocol B's tunnels 604, 606 may have their own overlay domain. In addition, each overlay domain may have the same IDs or different IDs.

When a packet is to be transferred between the first tunnel 602 and the second tunnel 604 of overlay protocol A, the packet's outermost MAC address may be set to be a MAC address of the IP interface 600 in order for the IP interface 600 to receive the packet. In order to transfer the packet between tunnels 602 and 604 at the same IP interface 600, bridging is performed between the tunnels 602, 604.

In one example, when the first tunnel 602 is a VXLAN tunnel, the tunnel termination is determined based on a virtual tunnel end point (VTEP), such as VTEP-A in this example, a virtual network identifier (VNID), such as VNID-A in this example, and a UDP destination port (DPORT), such as DPORT-A in this example. However, if tunnel 606 is a NVGRE tunnel, the tunnel termination is determined based on a VTEP, such as VTEP-B in this example, and a tenant ID (TNID), such as TNID-B in this example. Of course, any other tenant tunnel IDs may be used according to any other overlay protocol requirements.

Once the packet is received by the IP interface 600, L2 bridging may be performed using the IP interface 600 in order to bridge the packet across the IP interface in tunnels utilizing the same overlay protocol. In order to bridge between the tunnels 602, 604, when the tunnels use VXLAN, the VNID may be derived from the VNID and DPORT indicated in the previous overlay header. In another approach, the VNID may be derived from a fixed table driven relationship. The packet received at the IP interface 600 is decapsulated, and then re-encapsulated with the derived overlay header to be sent from the IP interface 600 to its intended destination.

Furthermore, when the tunnels 602, 604 use NVGRE, the TNID may be derived from the TNID indicated in the previous overlay header. The packet received at the IP interface 600 is decapsulated, and then re-encapsulated with the derived overlay header to be sent from the IP interface 600 to its intended destination. In another approach, the TNID may be derived from a fixed table driven relationship. Furthermore, the translation at the VTEP (X-VTEP) may be performed with the same IP interface 600 with the capability to end multi-protocol tunnels, as shown.

Figure 6B:
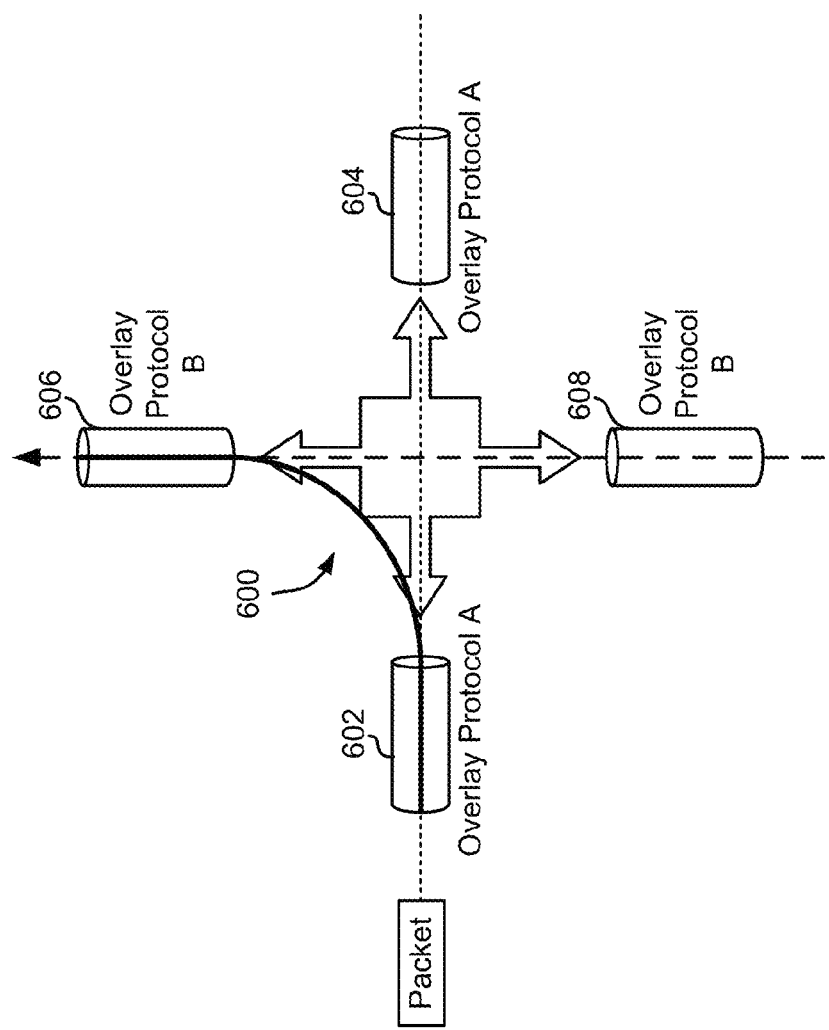

With reference to FIG. 6B, routing between heterogeneous overlay tunnels is described, according to one embodiment. When two or more tunnels 602, 604 utilizing the same overlay protocol, such as NVGRE, VXLAN, VPLS, OTV, etc., terminate on an IP interface 600 on which other heterogeneous overlay tunnels 606, 608 also terminate, a method of routing between the heterogeneous tunnels 602 and 606, 602 and 608, 604 and 606, or 604 and 608, and their associated overlay protocols, needs to be provided in order to seamlessly utilize each of the overlay tunnels that have a VTEP that is the IP interface 600.

In FIG. 6B, for simplicity, two tunnels 602, 604 of one overlay protocol A are shown terminating at the same IP interface 600 as two tunnels 606, 608 of another overlay protocol B, but any number of tunnels and overlay protocols may be terminated at the IP interface 600 according to processing capacity, among other factors. Protocol A's tunnels 602, 604 may have their own overlay domain, while overlay protocol B's tunnels 604, 606 may have their own overlay domain. In addition, each overlay domain may have the same IDs or different IDs.

When a packet is to be transferred between the first tunnel 602 of overlay protocol A and the first tunnel 606 of overlay protocol B, the packet's outermost MAC address may be set to be a MAC address of the IP interface 600 in order for the IP interface 600 to receive the packet. In order to transfer the packet between tunnels 602 and 606 at the same IP interface 600, L3 routing is performed between the tunnels 602, 606.

In one example, when the first tunnel 602 is a VXLAN tunnel, the tunnel termination is determined based on a virtual tunnel end point (VTEP), such as VTEP-A in this example, a virtual network identifier (VNID), such as VNID-A in this example, and a UDP destination port (DPORT), such as DPORT-A in this example. In addition, if tunnel 606 is a NVGRE tunnel, the tunnel termination is determined based on a VTEP, such as VTEP-B in this example, and a tenant ID (TNID), such as TNID-B in this example. Of course, any other tenant tunnel IDs may be used according to any other overlay protocol requirements.

Once the packet is received by the IP interface 600, L3 routing may be performed using the IP interface 600 in order to route the packet across the IP interface 600 in tunnels utilizing heterogeneous overlay protocols. In order to route between the tunnels 602, 606, when one tunnel uses VXLAN and one uses NVGRE, the VNID for tunnels 602, 604 may be derived based on a function of the TNID for tunnels 606, 608, e.g., VNID=$f$(TNID). In another approach, the VNID may be derived from a fixed table driven relationship. Furthermore, when the tunnels 606, 608 use NVGRE, the TNID may be a function of VNID and the DPORT, e.g., TNID=$f$(VNID, DPORT). In another approach, the TNID may be derived from a fixed table driven relationship. Furthermore, the translation at the VTEP (X-VTEP) may be performed with the same IP interface 600 with the capability to end multi-protocol tunnels, as shown.

This method of routing and bridging between homogenous and heterogeneous overlay tunnels may be performed regardless of the network component which performs overlay functionality. For example, an overlay network gateway, a server using an overlay-capable NIC, etc., may be used to provide the routing and bridging between heterogeneous tunnels.

Now referring to FIG. 7A, a server 700 using a NIC 716 having overlay network gateway functionality is shown according to another approach. The server 700 also comprises a virtualization platform 502 which provides and manages a virtual switch 504. The virtualization platform 502 also provides support for any number of VMs 514, shown in FIG. 7A as VM(0), VM(1), VM(2), . . . , VM(n). The VMs 514 may be arranged in one or more virtual networks (each virtual network may have a different or the same VNID).

In order to provide an interface between the NIC 716 and the virtualization platform 502 in the server 700, a NIC driver 714 may be provided in the server 700 which understands and supports the overlay network gateway functionality that has been provided by the NIC 716 (such as via an ONOS 702), and may manage the NIC 716 accordingly.

In this way, according to one embodiment, in order to adapt a server 700 for use with a different overlay protocol, a NIC driver 714 capable of interfacing with the overlay network protocol supported by an installed NIC 716 having overlay network gateway functionality may be implemented in the server 700.

In one embodiment, if the server 700 already has a NIC driver 714 installed that is capable of supporting a certain overlay protocol, and a NIC 716 having overlay network gateway functionality capable of providing the certain overlay protocol is installed in the server 700, then the NIC 716 may simply be inserted into an available PCIe slot of the server 700, and may operate once installed, in a plug-and-play type arrangement.

The NIC 716 may have overlay functionality provided in an ONOS 702, which may include any of the following modules: a tunnel manager 706 adapted for providing VTEP origination and termination operations and tunnel management operations, an ARP and FIB manager 708 adapted for providing address resolution for packets having an unknown address and forwarding information for packets having a known address, an IPMC support manager 710 adapted for handling multicast packets, forwarding ARP packets over L3 multicast with appropriate IP multicast group addresses, handling IPMC routing entries, and handling multicast membership, and a packet encapsulation and de-capsulation engine 712 adapted for encapsulating packets with an overlay header and stripping an overlay header from overlay-encapsulated packets. In addition, other engines or modules 704 may be provided which perform additional functions related to overlay network use, as would be understood by one of skill in the art.

Figure 7B:
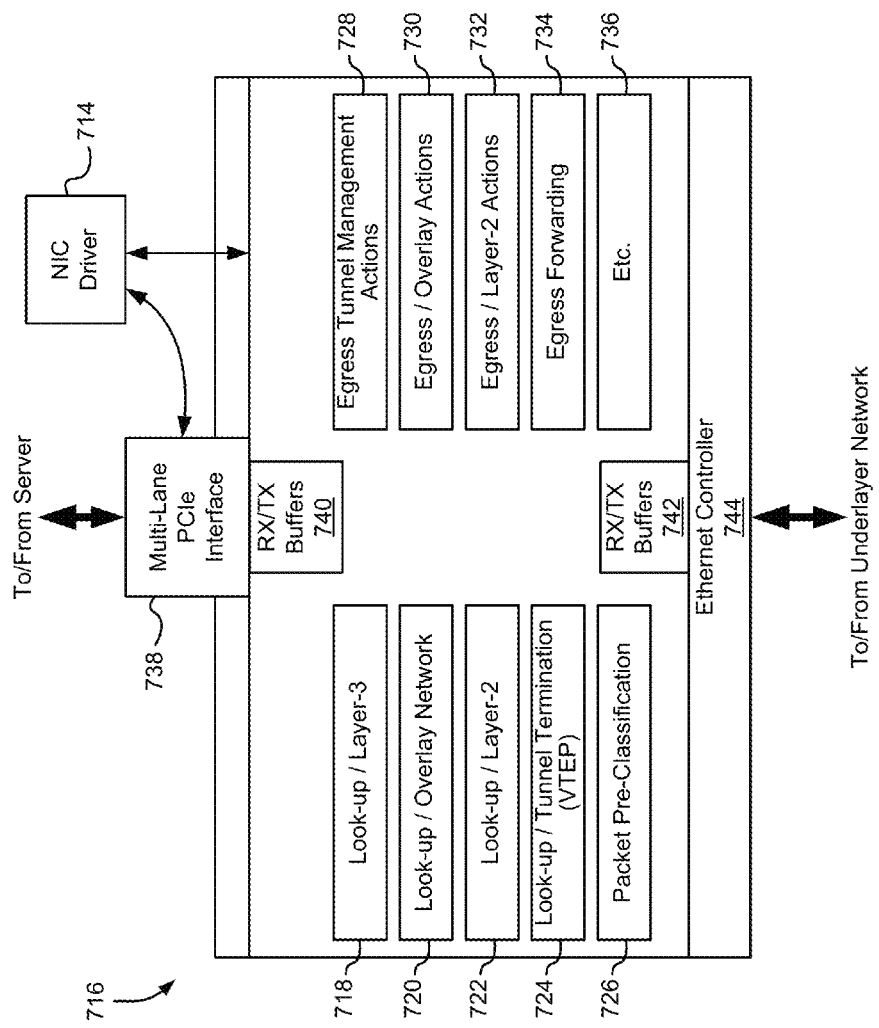
FIG. 7B shows the accelerated NIC having overlay network gateway functionality in more detail, according to one embodiment.

As shown in FIG. 7B, a NIC 716 having overlay network gateway functionality is shown in more detail according to one embodiment. The NIC 716 comprises a multi-lane PCIe interface 738 for interfacing with a server, receiving and transmitting (RX/TX) packet buffers 740 for caching traffic to/from the server, RX/TX packet buffers 742 for caching traffic to/from a network, an Ethernet controller 744 for interacting with the network, and the various overlay network gateway functionality in the form of logic, modules, or some combination thereof.

The NIC 716 makes use of one or more processors in order to provide overlay network gateway functionality, such that all overlay network gateway functionality may be offloaded onto the NIC 716, in one embodiment. This overlay network gateway functionality may be embedded as modules within the NIC 716, and may include, but is not limited to, performing look-ups for L3 addresses and devices 718, performing look-ups for overlay addresses and devices 720, performing look-ups for L2 addresses and devices 722, performing look-ups for tunnel addresses and devices 724, performing packet pre-classification 726, performing egress tunnel management actions (VTEP) 728, performing egress overlay actions 730, performing egress L2 actions 732, performing egress forwarding actions 734, along with possibly other packet functionality 736, as well as any other overlay network gateway functionality known in the art.

According to some embodiments, the egress tunnel management actions module 728 may be adapted for providing VTEP origination and termination operations, the various look-up modules 718, 720, 722, and 724 may be adapted for providing look-up operations for packets having an unknown address and forwarding information for packets having a known address, the various egress modules 728, 730, 732, and 734 may be adapted for handling the forwarding and/or sending operations for packets.

Some additional functionality may include interacting with the virtualization platform and the virtual switch and/or providing I/O virtualization.

In one embodiment, priority of incoming packets may be mapped at ingress based on rules or based on the priority of the inner packet. The outer and inner packet processing may be based on the priority mapping created at ingress. Furthermore, egress 802.1p priority may be maintained as per ingress priority mapping.

Figure 7C:
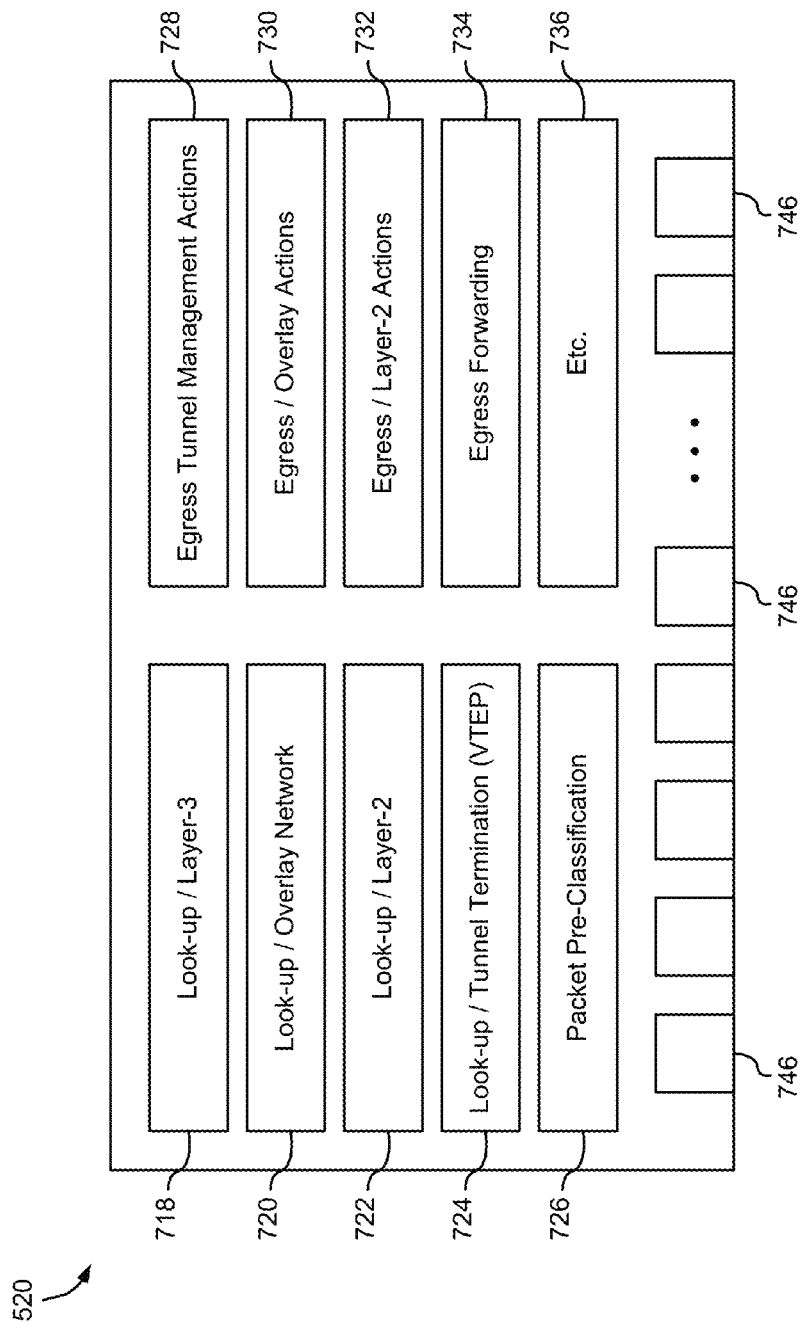
FIG. 7C shows a detailed view of an overlay network gateway according to one approach.

Referring now to FIG. 7C, a detailed view of an overlay network gateway 520 is shown according to one approach. The overlay network gateway 746 comprises a plurality of ports 746 which may be used for packet ingress and/or packet egress. Any number of ports 746 may be present, depending on the arrangement and capabilities of the overlay network gateway 520, such as 16 ports, 32, ports, 64 ports, 128 ports, etc. The overlay network gateway 520 also comprises logic adapted for performing look-ups for L3 addresses and devices 718, logic adapted for performing look-ups for overlay addresses and devices 720, logic adapted for performing look-ups for L2 addresses and devices 722, logic adapted for performing look-ups for tunnel addresses and devices 724, logic adapted for performing packet pre-classification 726, logic adapted for performing egress tunnel management actions (VTEP) 728, logic adapted for performing egress overlay actions 730, logic adapted for performing egress L2 actions 732, logic adapted for performing egress forwarding actions 734, along with possibly other packet functionality 736. Any or all of this logic may be implemented in hardware or software, or a combination thereof. For example, separate modules for each distinct logic block may be implemented in one or more processors, in one embodiment. The processor(s) may include, but are not limited to, an application specific integrated circuit (ASIC), a field programmable gate array (FPGA), a central processing unit (CPU), a microcontroller (MC), a microprocessor, or some other processor known in the art.

In one embodiment, priority of incoming packets may be mapped at ingress based on rules or based on the priority of the inner packet. The outer and inner packet processing may be based on the priority mapping created at ingress. Furthermore, egress 802.1p priority may be maintained as per ingress priority mapping.

Figure 8:
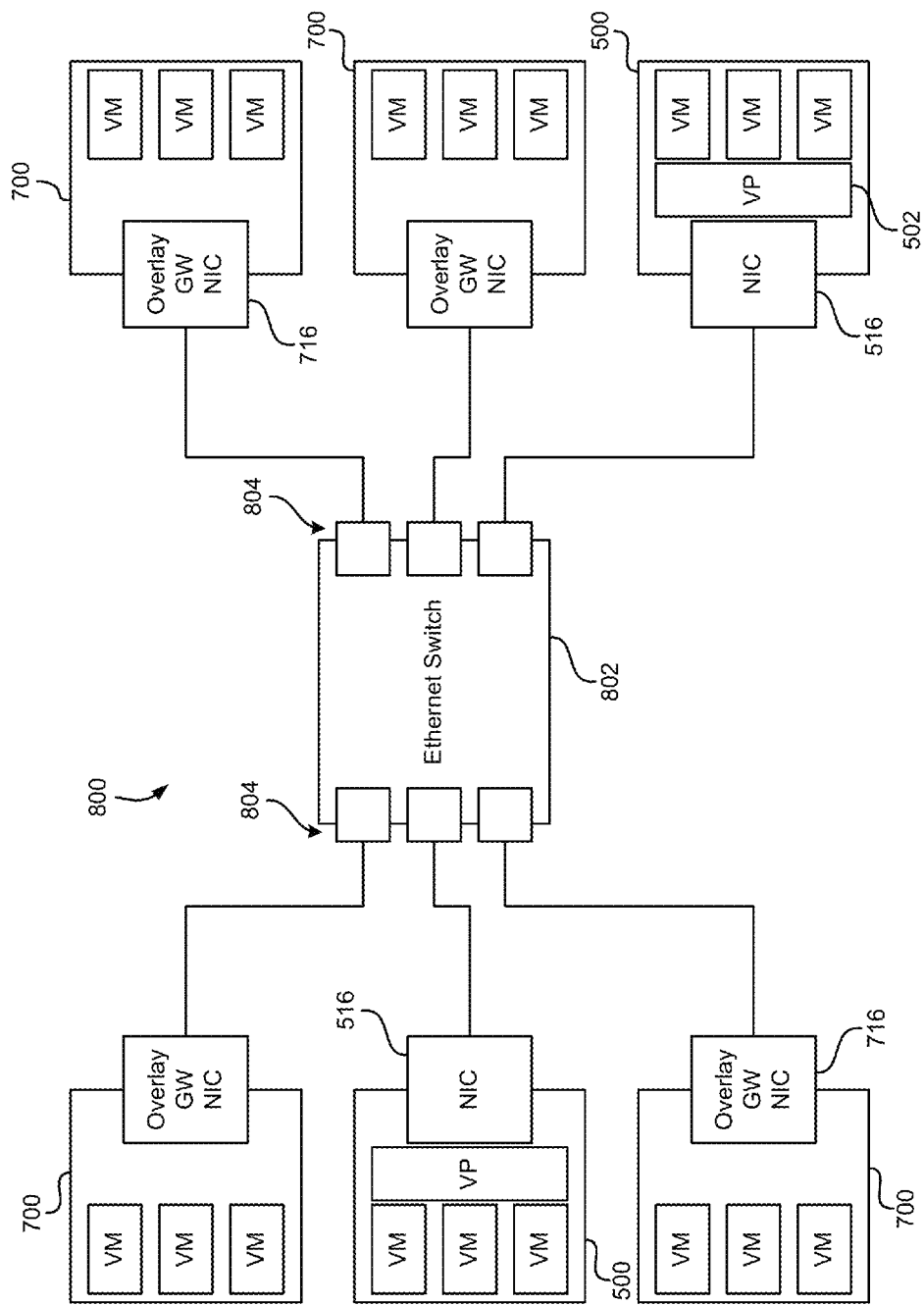
FIG. 8 shows a network according to one embodiment.

A network 800 is shown according to one embodiment in FIG. 8. As shown, servers 500 having contemporary NICs 516 and servers 700 having overlay gateway (GW) NICs 716 may be used in the same network 800. One or more Ethernet switches 802 may be used to interconnect the servers 500, 700 or the servers 500, 700 may be connected directly to one another. Each Ethernet switch 802 includes a plurality of ports 804 for connecting thereto. The contemporary NICs 516 may include a virtualization platform (VP) 502 that may provide some overlay functionality.

According to one embodiment, any component shown in the network 800 may include functionality for determining a priority of packets. In one such embodiment, a system (such as a server 500, 700, an Ethernet switch 802, an overlay GW NIC 716, a virtualization platform 502, etc.) may comprise logic adapted for receiving an overlay-encapsulated packet comprising one or more underlay packets, logic adapted for decapsulating the one or more underlay packets from the overlay-encapsulated packet, logic adapted for deriving a priority for each of the one or more underlay packets based on information included in the overlay-encapsulated packet, and logic adapted for setting the priority of the one or more underlay packets. The information used to derive priority may be a priority of the overlay-encapsulated packet, determined from a transport header of the overlay-encapsulated packet and/or an application designation of the one or more underlay packets, or based on any other information related to the overlay-encapsulated packet.

In one approach, the logic adapted for setting the priority for each of the one or more underlay packets may include logic adapted for setting each underlay layer-2 packet's 802.1p bits to designate the derived priority. In this way, any device which relies on the underlay packet's 802.1p bits will be able to determine the priority of the underlay packet(s). Furthermore, the priority of the overlay-encapsulated packet may be designated via the overlay-encapsulated packet's 802.1p bits, and in this approach, the priority for each of the one or more underlay packets may be derived from the overlay-encapsulated packet's 802.1p bits.

In another approach, the logic adapted for setting the priority for each of the one or more underlay packets may comprise logic adapted for setting each underlay layer-3 packet's Differentiated Services Code Point (DSCP) value to designate a particular quality of service (QoS), as is understood in the art. The priority of the overlay-encapsulated packet may be designated via the overlay-encapsulated packet's DSCP value, and in this approach, the priority for each of the one or more underlay packets may be derived from at least the overlay-encapsulated packet's DSCP value, and possibly from other information sources, such as the overlay-encapsulated packet's 802.1p bits.

In one embodiment, logic adapted for egress processing the one or more underlay packets may be included in a traffic manager. The egress processing may be based on the derived priority or a DSCP mapping. Furthermore, the logic adapted for setting the priority for each of the one or more underlay packets may comprise logic adapted for setting each underlay layer-2 packet's 802.1q tag to designate the derived priority when the one or more underlay packets are egress processed by the traffic manager.

In a further approach, logic adapted for ingress processing the one or more underlay packets using the traffic manager may be included in the system, with the ingress processing being based on the derived priority or the DSCP mapping.

In one approach, a DSCP or 802.1p priority may be determined based on a mapping table, as shown in Table 1. In this approach, access control lists (ACLs) may be used to dictate processing once a certain criterion has been met. This mapping table correlates an ACL to specific 802.1p bits, and to specific DSCP value mapping, such that the 802.1p bits may be correlated to DSCP values. In this exemplary table, ACL 1, ACL 2, and ACL 3 are different ACLs which may cause different actions to be performed in response to the ACL being enacted. Also, the 802.1p priority mapping bits listed are for example only, and any of the 0-7 available priorities (0x1, 0x2, ..., 0x7) may be assigned according to any desired mapping. Furthermore, Mapping_1, Mapping_2, and Mapping_3 are different DSCP mappings which cause different DSCP values to be inserted into a packet depending on the ACL applied or 802.1p priority bits.

TABLE 1

| Rule | 802.1p Priority Mapping | DSCP Value Mapping |
| --- | --- | --- |
| ACL 1 | 0x7 | Mapping_1 |
| ACL 2 | 0x3 | Mapping_2 |
| ACL 3 | 0x4 | Mapping_3 |
| ... | ... | ... |
| ACL n | 0x1 | Mapping_n |

The ACL rule tuples may include any relevant information, such as an underlay packet's source MAC (SMAC) address, destination MAC (DMAC) address, Ethertype, VLAN identifier (ID), priority, source IP (SIP) address, destination IP (DIP) address, protocol used, source port (SPORT), destination port (DPORT), etc. The ACL tuples may further be based on an overlay-encapsulated packet's SMAC address, DMAC address, Ethertype, VLAN ID, priority, SIP address, DIP address, protocol used, SPORT, DPORT, etc. In more approaches, the ACL tuples may be based on a UDP SPORT, a UDP DPORT, a VNID, etc.

According to one embodiment, and with reference to any of FIGS. 1-8, a network system may include multi-protocol VTEP logic implemented in and/or integrated with a network device, the logic being adapted for terminating one or more first overlay network tunnels which adhere to a first overlay network protocol, terminating one or more second overlay network tunnels which adhere to a second overlay network protocol; and providing multi-protocol overlay functionality to packets received by the network device. The network device may be any suitable or capable device that is adapted to provide multi-protocol overlay functionality, such as a server, an accelerated NIC, a network switch, a network gateway, etc.

The network device may be a server in one approach, the server including an accelerated NIC and a NIC driver, the accelerated NIC further comprising a plurality of network ports including multiple PCIe ports for interfacing with a server, and an ONOS adapted to provide overlay functionality to network traffic received by the accelerated NIC. Furthermore, the accelerated NIC may include functionality to allow the overlay network traffic to bypass the ONOS when overlay functionality is provided by a virtualization platform or an overlay gateway. In another further approach, the NIC driver may include functionality for writing status updates and checking status changes and functionality for managing operations of the accelerated NIC. Also, the ONOS may further include a tunnel manager adapted for providing VTEP origination and termination operations and tunnel management operations, an ARP and FIB manager adapted for providing address resolution for packets having an unknown address and forwarding information for packets having a known address, an IPMC support manager adapted for handling multicast packets, forwarding ARP packets over L3 multicast with appropriate IP multicast group addresses, handling IPMC routing entries, and handling multicast membership, and a packet encapsulation and de-capsulation engine adapted for encapsulating packets with an overlay header and stripping an overlay header from overlay-encapsulated packets.

In another embodiment, the network device may be a server comprising a virtualization platform coupled to one or more VMs, the virtualization platform further including functionality for providing support for the one or more VMs, functionality for providing a virtual switch, the virtual switch being adapted for providing switching functionality, across a network, to network traffic received from or sent to the one or more VMs, functionality for providing overlay functionality to network traffic, and a NIC driver adapted for interfacing with and supporting a NIC for interfacing with the network.

In another approach, the logic adapted for providing multi-protocol overlay functionality may be adapted for receiving first overlay network traffic, the first overlay network traffic comprising a plurality of overlay-encapsulated packets which adhere to the first overlay network protocol, routing the first overlay network traffic to at least one of the one or more second overlay network tunnels terminated at the network device, and bridging the first overlay network traffic to at least one of the one or more first overlay network tunnels terminated at the network device. Furthermore, in one approach, the logic adapted for providing multi-protocol overlay functionality may be further adapted for receiving second overlay network traffic, the second overlay network traffic comprising a plurality of overlay-encapsulated packets which adhere to the second overlay network protocol, routing the second overlay network traffic to at least one of the one or more first overlay network tunnels terminated at the network device, and bridging the second overlay network traffic to at least one of the one or more second overlay network tunnels terminated at the network device.

In another approach, the logic adapted for providing multi-protocol overlay functionality may further be adapted for receiving one or more packets encapsulated with a first overlay protocol that have a destination specified as a tunnel which adheres to the first overlay protocol, wherein the one or more packets have an outermost MAC address that corresponds to a MAC address of a port or an IP interface of the network device, and bridging the one or more packets encapsulated with the first overlay protocol over L2 between a first overlay tunnel that adheres to the first overlay protocol and the destination overlay tunnel that adheres to the first overlay protocol.

In yet another approach, the logic adapted for providing multi-protocol overlay functionality may be further adapted for receiving one or more packets encapsulated with a first overlay protocol that have a destination specified as a tunnel which adheres to a second overlay protocol, wherein the one or more packets have an outermost MAC address that corresponds to a MAC address of a port or an IP interface of the network device, determining a second encapsulation for the one or more packets that adheres to the second overlay protocol, and routing the one or more packets encapsulated with the second overlay protocol over L3 between a first overlay tunnel that adheres to the first overlay protocol and the destination overlay tunnel which adheres to the second overlay protocol.

According to another embodiment, the logic adapted for routing the one or more packets may be further adapted for determining a TNID for the one or more packets based on a function of a VNID and DPORT specified in a VXLAN header of the one or more packets when the first overlay protocol is VXLAN and the second overlay protocol is NVGRE, and determining a VNID for the one or more packets based on a function of a TNID specified in the NVGRE header of the one or more packets when the first overlay protocol is NVGRE and the second overlay protocol is VXLAN.

Figure 9:
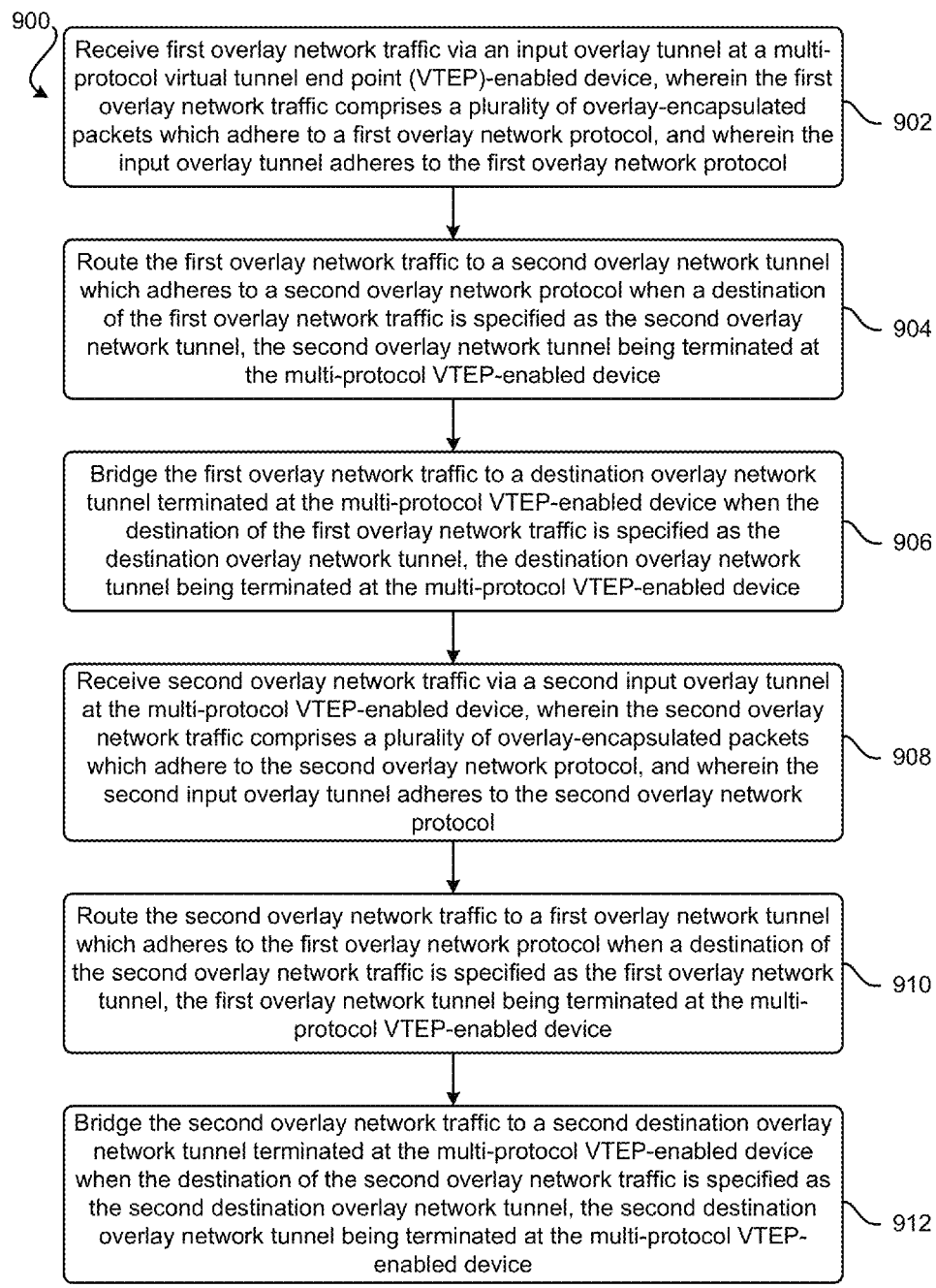
FIG. 9 is a flowchart of a method, according to one embodiment.

Now referring to FIG. 9, a method 900 for providing multi-protocol overlay handling is shown according to one embodiment. The method 900 may be performed in accordance with the present invention in any of the environments depicted in FIGS. 1-8, among others, in various embodiments. Of course, more or less operations than those specifically described in FIG. 9 may be included in method 900, as would be understood by one of skill in the art upon reading the present descriptions.

Each of the steps of the method 900 may be performed by any suitable component of the operating environment. For example, in various non-limiting embodiments, the method 900 may be partially or entirely performed by an overlay-capable NIC, a processor (such as a CPU, an ASIC, a FPGA, etc.) which may be embedded in and/or operate within a NIC, virtualization platform, or server, computer program code embedded in a computer readable storage medium, etc.

As shown in FIG. 9, method 900 may initiate with operation 902, where first overlay network traffic is received via an input overlay tunnel at a multi-protocol VTEP-enabled device. The first overlay network traffic comprises a plurality of overlay-encapsulated packets which adhere to a first overlay network protocol, and the input overlay tunnel adheres to the first overlay network protocol.

In one embodiment, the multi-protocol VTEP-enabled device may be a server comprising an accelerated NIC and a NIC driver, the accelerated NIC being capable of terminating tunnels having heterogeneous overlay protocols.

According to another embodiment, the multi-protocol VTEP-enabled device may be a server comprising a virtualization platform coupled to one or more VMs, the virtualization platform being capable of terminating tunnels having heterogeneous overlay protocols.

Of course, any VTEP-enabled device capable of terminating and handling overlay traffic from heterogeneous overlay protocols may be used in method 900, as would be understood by one of skill in the art upon reading the present descriptions.

In operation 904, the first overlay network traffic is routed to a second overlay network tunnel which adheres to a second overlay network protocol when a destination of the first overlay network traffic is specified as the second overlay network tunnel. This routing takes place over L3. The second overlay network tunnel is terminated at the multi-protocol VTEP-enabled device, thereby allowing the multi-protocol VTEP-enabled device to route between tunnels having heterogeneous overlay protocols (different overlay protocols for each tunnel).

In operation 906, the first overlay network traffic is bridged to a destination overlay network tunnel terminated at the multi-protocol VTEP-enabled device when the destination of the first overlay network traffic is specified as the destination overlay network tunnel. This bridging takes place over L2. The destination overlay network tunnel is terminated at the multi-protocol VTEP-enabled device, thereby allowing the multi-protocol VTEP-enabled device to bridge between tunnels having homogeneous overlay protocols (the input overlay network tunnel and the destination overlay network tunnel), even though most overlay protocols do not allow for bridging between tunnels. This is because the multi-protocol VTEP-enabled device is configured to terminate one tunnel and bridge the network traffic over to another overlay tunnel having the same overlay protocol.

In optional operation 908, second overlay network traffic is received via a second input overlay tunnel at the multi-protocol VTEP-enabled device. The second overlay network traffic comprises a plurality of overlay-encapsulated packets which adhere to the second overlay network protocol, and the second input overlay tunnel adheres to the second overlay network protocol.

In optional operation 910, the second overlay network traffic is routed (over L3) to a first overlay network tunnel which adheres to the first overlay network protocol when a destination of the second overlay network traffic is specified as the first overlay network tunnel. The first overlay network tunnel is terminated at the multi-protocol VTEP-enabled device.

In optional operation 912, the second overlay network traffic is bridged (over L2) to a second destination overlay network tunnel terminated at the multi-protocol VTEP-enabled device when the destination of the second overlay network traffic is specified as the second destination overlay network tunnel. The second destination overlay network tunnel is terminated at the multi-protocol VTEP-enabled device.

In more approaches, the method 900 may further include determining a first encapsulation for the plurality of overlay-encapsulated packets that adheres to the first overlay protocol prior to routing the plurality of overlay-encapsulated packets (which now adhere to the second overlay protocol) to the first overlay network tunnel.

In addition, the first encapsulation for the plurality of overlay-encapsulated packets may include determining a TNID for the plurality of overlay-encapsulated packets, which may be based on a function of a VNID and DPORT specified in a VXLAN header of the plurality of overlay-encapsulated packets when the second overlay protocol is VXLAN and the first overlay protocol is NVGRE. Alternatively, a VNID for the plurality of overlay-encapsulated packets may be determined based on a function of a TNID specified in the NVGRE header of the plurality of overlay-encapsulated packets when the second overlay protocol is NVGRE and the first overlay protocol is VXLAN.

Typically, but not always, the first overlay network traffic may include a plurality of packets which have an outermost MAC address that corresponds to a MAC address of a port or an IP interface of the multi-protocol VTEP device.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A network system, comprising:
   multi-protocol virtual tunnel end point (VTEP) logic implemented in an accelerated network interface card (NIC) of a server, the server comprising:

the accelerated NIC and a NIC driver, the accelerated NIC comprising:
a plurality of network ports including multiple Peripheral Component Interconnect express (PCIe) ports for interfacing with the server; and
an Overlay Network Offload System (ONOS), the ONOS being configured to provide overlay functionality to network traffic received by the accelerated NIC,
wherein the logic is configured to:
terminate one or more first overlay network tunnels which adhere to a first overlay network protocol;
terminate one or more second overlay network tunnels which adhere to a second overlay network protocol; and
provide multi-protocol overlay functionality to packets received by the server.

2. The network system as recited in claim 1, wherein the accelerated NIC further comprises functionality to allow the overlay network traffic to bypass the ONOS when overlay functionality is provided by a virtualization platform or an overlay gateway.

3. The network system as recited in claim 1, wherein the NIC driver comprises:
functionality for writing status updates and checking status changes; and
functionality for managing operations of the accelerated NIC.

4. The network system as recited in claim 1, wherein the ONOS further comprises:
a tunnel manager configured to provide VTEP origination and termination operations and tunnel management operations;
an address resolution protocol (ARP) and forwarding information base (FIB) manager configured to provide address resolution for packets having an unknown address and forwarding information for packets having a known address;
an internet protocol multicast (IPMC) support manager configured to handle multicast packets, forward ARP packets over Layer-3 (L3) multicast with appropriate internet protocol (IP) multicast group addresses, handle IPMC routing entries, and handle multicast membership; and
a packet encapsulation and de-capsulation engine configured to encapsulate packets with an overlay header and strip an overlay header from overlay-encapsulated packets.

5. The network system as recited in claim 1, wherein the server further comprises a virtualization platform coupled to one or more virtual machines (VMs), the virtualization platform comprising:
functionality for providing support for the one or more VMs;
functionality for providing a virtual switch, the virtual switch being configured to provide switching functionality, across a network, to network traffic received from or sent to the one or more VMs; and
functionality for providing overlay functionality to network traffic.

6. The network system as recited in claim 1, wherein the logic configured to provide multi-protocol overlay functionality to packets received by the network device is configured to:
receive first overlay network traffic, the first overlay network traffic comprising a plurality of overlay-encapsulated packets which adhere to the first overlay network protocol;
route the first overlay network traffic to at least one of the one or more second overlay network tunnels terminated at the network device; and
bridge the first overlay network traffic to at least one of the one or more first overlay network tunnels terminated at the network device.

7. The network system as recited in claim 6, wherein the logic configured to provide multi-protocol overlay functionality to packets received by the network device is further configured to:
receive second overlay network traffic, the second overlay network traffic comprising a plurality of overlay-encapsulated packets which adhere to the second overlay network protocol;
route the second overlay network traffic to at least one of the one or more first overlay network tunnels terminated at the network device; and
bridge the second overlay network traffic to at least one of the one or more second overlay network tunnels terminated at the network device.

8. The network system as recited in claim 1, wherein the logic configured to provide multi-protocol overlay functionality to packets received by the network device is further configured to:
receive one or more packets encapsulated with a first overlay protocol that have a destination specified as a tunnel which adheres to the first overlay protocol, wherein the one or more packets have an outermost media access control (MAC) address that corresponds to a MAC address of a port or an IP interface of the network device; and
bridge the one or more packets encapsulated with the first overlay protocol over layer-2 (L2) between a first overlay tunnel that adheres to the first overlay protocol and the destination overlay tunnel that adheres to the first overlay protocol.

9. The network system as recited in claim 1, wherein the logic configured to provide multi-protocol overlay functionality to packets received by the network device is further configured to:
receive one or more packets encapsulated with a first overlay protocol that have a destination specified as a tunnel which adheres to a second overlay protocol, wherein the one or more packets have an outermost media access control (MAC) address that corresponds to a MAC address of an IP interface of the network device;
determine a second encapsulation for the one or more packets that adheres to the second overlay protocol; and
route the one or more packets encapsulated with the second overlay protocol over layer-3 (L3) between a first overlay tunnel that adheres to the first overlay protocol and the destination overlay tunnel which adheres to the second overlay protocol.

10. The network system as recited in claim 9, wherein the logic configured to route the one or more packets is further configured to:
determine a tenant identifier (TNID) for the one or more packets based on a function of a virtual network identifier (VNID) and destination port (DPORT) specified in a Virtual eXtensible Local Area Network (VXLAN) header of the one or more packets when the first overlay protocol is VXLAN and the second overlay protocol is Network Virtualization using Generic Routing Encapsulation (NVGRE); and determine a VNID for the one or more packets based on a function of a TNID specified in the NVGRE header of the one or more packets when the first overlay protocol is NVGRE and the second overlay protocol is VXLAN.

11. An accelerated network interface card (NIC), the accelerated NIC comprising:

a plurality of network ports including multiple Peripheral Component Interconnect express (PCIe) ports for interfacing with a server;

an Overlay Network Offload System (ONOS), the ONOS being configured to provide overlay functionality to network traffic received by the accelerated NIC;

logic configured to terminate one or more first overlay network tunnels which adhere to a first overlay network protocol;

logic configured to terminate one or more second overlay network tunnels which adhere to a second overlay network protocol; and logic configured to provide multi-protocol overlay functionality to packets received by the accelerated NIC.

12. The accelerated NIC as recited in claim 11, further comprising functionality to allow the overlay network traffic to bypass the ONOS when overlay functionality is provided by a virtualization platform or an overlay gateway.

13. The accelerated NIC as recited in claim 11, wherein the ONOS further comprises:

a tunnel manager configured to provide VTEP origination and termination operations and tunnel management operations;

an address resolution protocol (ARP) and forwarding information base (FIB) manager configured to provide address resolution for packets having an unknown address and forwarding information for packets having a known address;

an internet protocol multicast (IPMC) support manager configured to handle multicast packets, forward ARP packets over Layer-3 (L3) multicast with appropriate internet protocol (IP) multicast group addresses, handle IPMC routing entries, and handle multicast membership; and a packet encapsulation and de-capsulation engine configured to encapsulate packets with an overlay header and strip an overlay header from overlay-encapsulated packets.

14. The accelerated NIC as recited in claim 11, wherein the server comprises a virtualization platform coupled to one or more virtual machines (VMs), the virtualization platform comprising:

functionality for providing overlay functionality to network traffic; and a network interface card (NIC) driver configured to interface with and support the accelerated NIC for interfacing with a network, wherein the accelerated NIC further comprises functionality to allow the overlay network traffic to bypass the ONOS when overlay functionality is provided by the virtualization platform of the server.

15. The accelerated NIC as recited in claim 11, wherein the logic configured to provide multi-protocol overlay functionality to packets received by the network device is configured to:

receive first overlay network traffic, the first overlay network traffic comprising a plurality of overlay-encapsulated packets which adhere to the first overlay network protocol;

route the first overlay network traffic to at least one of the one or more second overlay network tunnels terminated at the network device; and bridge the first overlay network traffic to at least one of the one or more first overlay network tunnels terminated at the network device.

16. The accelerated NIC as recited in claim 15, wherein the logic configured to provide multi-protocol overlay functionality to packets received by the network device is further configured to:

receive second overlay network traffic, the second overlay network traffic comprising a plurality of overlay-encapsulated packets which adhere to the second overlay network protocol;

route the second overlay network traffic to at least one of the one or more first overlay network tunnels terminated at the network device; and bridge the second overlay network traffic to at least one of the one or more second overlay network tunnels terminated at the network device.

17. The accelerated NIC as recited in claim 11, wherein the logic configured to provide multi-protocol overlay functionality to packets received by the network device is further configured to:

receive one or more packets encapsulated with a first overlay protocol that have a destination specified as a tunnel which adheres to the first overlay protocol, wherein the one or more packets have an outermost media access control (MAC) address that corresponds to a MAC address of a port or an IP interface of the network device; and bridge the one or more packets encapsulated with the first overlay protocol over layer-2 (L2) between a first overlay tunnel that adheres to the first overlay protocol and the destination overlay tunnel that adheres to the first overlay protocol.

18. The accelerated NIC as recited in claim 11, wherein the logic configured to provide multi-protocol overlay functionality to packets received by the network device is further configured to:

receive one or more packets encapsulated with a first overlay protocol that have a destination specified as a tunnel which adheres to a second overlay protocol, wherein the one or more packets have an outermost media access control (MAC) address that corresponds to a MAC address of an IP interface of the network device;

determine a second encapsulation for the one or more packets that adheres to the second overlay protocol; and route the one or more packets encapsulated with the second overlay protocol over layer-3 (L3) between a first overlay tunnel that adheres to the first overlay protocol and the destination overlay tunnel which adheres to the second overlay protocol.

19. The accelerated NIC as recited in claim 11, wherein the logic configured to route the one or more packets is further configured to:

determine a tenant identifier (TNID) for the one or more packets based on a function of a virtual network identifier (VNID) and destination port (DPORT) specified in a Virtual eXtensible Local Area Network (VXLAN) header of the one or more packets when the first overlay protocol is VXLAN and the second overlay protocol is Network Virtualization using Generic Routing Encapsulation (NVGRE); and determine a VNID for the one or more packets based on a function of a TNID specified in the NVGRE header of the one or more packets when the first overlay protocol is NVGRE and the second overlay protocol is VXLAN.

* * * * *